US009609474B2

United States Patent
Huang et al.

(10) Patent No.: US 9,609,474 B2
(45) Date of Patent: Mar. 28, 2017

(54) LOCALIZATION USING A WIRELESS TAG SUPPORTING MULTIPLE STATES

(71) Applicants: Howard C. Huang, New York, NY (US); Irwin Kennedy, Londonderry (IE); Chih-Kuang Lin, Dubin (IE); Vijay Venkateswaran, Dublin (IE); Richard Abbot, Belle Mead, NJ (US)

(72) Inventors: Howard C. Huang, New York, NY (US); Irwin Kennedy, Londonderry (IE); Chih-Kuang Lin, Dubin (IE); Vijay Venkateswaran, Dublin (IE); Richard Abbot, Belle Mead, NJ (US)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/613,488

(22) Filed: Feb. 4, 2015

(65) Prior Publication Data

US 2016/0227360 A1  Aug. 4, 2016

(51) Int. Cl.
*H04W 24/00* (2009.01)
*H04W 4/02* (2009.01)
*G06K 7/10* (2006.01)

(52) U.S. Cl.
CPC .......... *H04W 4/02* (2013.01); *G06K 7/10366* (2013.01)

(58) Field of Classification Search
CPC ............................ H04W 4/02; G06K 7/10366
USPC ......... 455/456.1, 456.2, 456.3, 456.4, 456.5, 455/456.6, 457
See application file for complete search history.

(56) References Cited

U.S. PATENT DOCUMENTS 9,197,995 B1 * 11/2015 DeAngelis .............. H04L 51/32
2012/0290311 A1 * 11/2012 Tara ........................ G01S 19/17
705/2

(Continued)

OTHER PUBLICATIONS

TAGG, "Tagg the Pet Tracker," downloaded from http://www.pettracker.com/GPS-Pet-Tracker-From-Tagg on Sep. 12, 2016, 2 pages.

*Primary Examiner* — Shahriar Behnamian
(74) *Attorney, Agent, or Firm* — Tong, Rea, Bentley & Kim, LLC (57) ABSTRACT

A capability for controlling or facilitating the use of a wireless tag to communicate location tracking information is presented. The capability for controlling or facilitating use of a wireless tag to communicate location tracking information utilizes a wireless tag supporting multiple states in order to control communication of location tracking information. The wireless tag supporting multiple states in order to control communication of location tracking information may be configured to support or facilitate tag-controlled state transitions, gateway-controlled state transitions, infrastructure-controlled state transitions, or the like, as well as various combinations thereof. The multiple states of the wireless tag may specify use of different sets of wireless gateways for communication of location tracking information, use of different protocols for communication of location tracking information, use of different air interfaces for communication of location tracking information, use of different performance parameters for communication of location tracking information, or the like.

17 Claims, 3 Drawing Sheets

(56) References Cited

U.S. PATENT DOCUMENTS

| | | | | |
|---|---|---|---|---|
| 2012/0309422 A1* | 12/2012 | Lewis-Evans | ...... | B60R 25/1025 |
| | | | | 455/456.1 |
| 2014/0148196 A1* | 5/2014 | Bassan-Eskenazi | .... | G01S 11/02 |
| | | | | 455/456.1 |
| 2016/0073373 A1* | 3/2016 | Lewis-Evans | ........ | H04W 64/00 |
| | | | | 455/456.1 |

* cited by examiner

LOCALIZATION USING A WIRELESS TAG SUPPORTING MULTIPLE STATES

TECHNICAL FIELD

The disclosure relates generally to a wireless communication system and, more specifically but not exclusively, to localization of a wireless tag using a wireless communication system.

BACKGROUND

In general, location-based services (LBSs) are a general class of services that use location tracking information in various contexts and for various purposes. For example, LBSs may be used to identify or track the location of a person or an object (e.g., indoor object searches, providing personalized services to people, or the like), to support mobile commerce, or the like. The location tracking information that is used in LBSs may be communicated by mobile end user devices (e.g., smartphones, tablets, or the like), sensors, or the like. Disadvantageously, however, there are various problems associated with existing mechanisms for communication of location tracking information used in LBSs.

SUMMARY OF EMBODIMENTS

Various deficiencies in the prior art are addressed by embodiments for controlling or facilitating use of a wireless tag to communicate location tracking information.

In at least some embodiments, a wireless tag includes a wireless communication module configured for communication of wireless signals including location tracking information and a controller communicatively connected to the wireless communication module. The controller is configured to control a transition of the wireless tag from a first state in which the wireless tag is configured to support communication of the location tracking information via a first wireless gateway to a second state in which the wireless tag is configured to support communication of the location tracking information via a second wireless gateway. The controller is configured to control the transition of the wireless tag from the first state to the second state based on a transition message received from the first wireless gateway or the second wireless gateway.

In at least some embodiment, a method for use by a wireless tag includes using a processor and a memory for receiving a transition command from a first wireless gateway or a second wireless gateway and controlling a transition of the wireless tag, based on the received transition command, from a first state in which the wireless tag is configured to support communication of location tracking information via the first wireless gateway to a second state in which the wireless tag is configured to support communication of location tracking information via the second wireless gateway.

In at least some embodiments, a wireless gateway includes a processor and a memory communicatively connected to the processor, wherein the processor is configured to detect a condition associated with a wireless tag configured to support communication of location tracking information and wherein the processor is configured to send a message configured to control or facilitate a transition of the wireless tag from a first state in which the wireless tag is configured to support communication of the location tracking information via the wireless gateway to a second state in which the wireless tag is configured to support communication of the location tracking information via a second wireless gateway.

In at least some embodiments, a method for use by a wireless gateway includes using a processor and a memory for detecting a condition associated with a wireless tag configured to support communication of location tracking information and sending a message configured to control or facilitate a transition of the wireless tag from a first state in which the wireless tag is configured to support communication of the location tracking information via the wireless gateway to a second state in which the wireless tag is configured to support communication of the location tracking information via a second wireless gateway.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

A capability for controlling or facilitating the use of a wireless tag to communicate location tracking information is presented. In at least some embodiments, the capability for controlling or facilitating use of a wireless tag to communicate location tracking information utilizes a wireless tag supporting multiple states in order to communicate location tracking information. In at least some embodiments, a wireless tag supporting multiple states in order to communicate location tracking information may be configured to support or facilitate tag-controlled state transitions, gateway-controlled state transitions, infrastructure-controlled state transitions, or the like, as well as various combinations thereof. In at least some embodiments, a wireless tag may include (1) a wireless communication module configured for communication of wireless signals (which may include location tracking information and, optionally, other types of information) and (2) a controller communicatively connected to the wireless communication module and configured to control a transition of the wireless tag from a first state in which the wireless tag is configured to support communication via a first wireless gateway to a second state in which the wireless tag is configured to support communication via a second wireless gateway. In at least some embodiments, a wireless gateway may be configured to support or facilitate tag-controlled state transitions, gateway-controlled state transitions, infrastructure-controlled state transitions, or the like, as well as various combinations thereof. In at least some embodiments, a wireless gateway may be configured to (1) detect a condition associated with a wireless tag configured to support communication of location tracking information and (2) send a message configured to control or facilitate a transition of the wireless tag from a first state in which the wireless tag is configured to support communication of the location tracking information via the wireless gateway to a second state in which the wireless tag is configured to support communication of the location tracking information via a second wireless gateway. These and various other embodiments and advantages of the capability for controlling or facilitating the use of a wireless tag to communicate location tracking information may be further understood by way of reference to the exemplary wireless communication system of FIG. 1.

Figure 1:
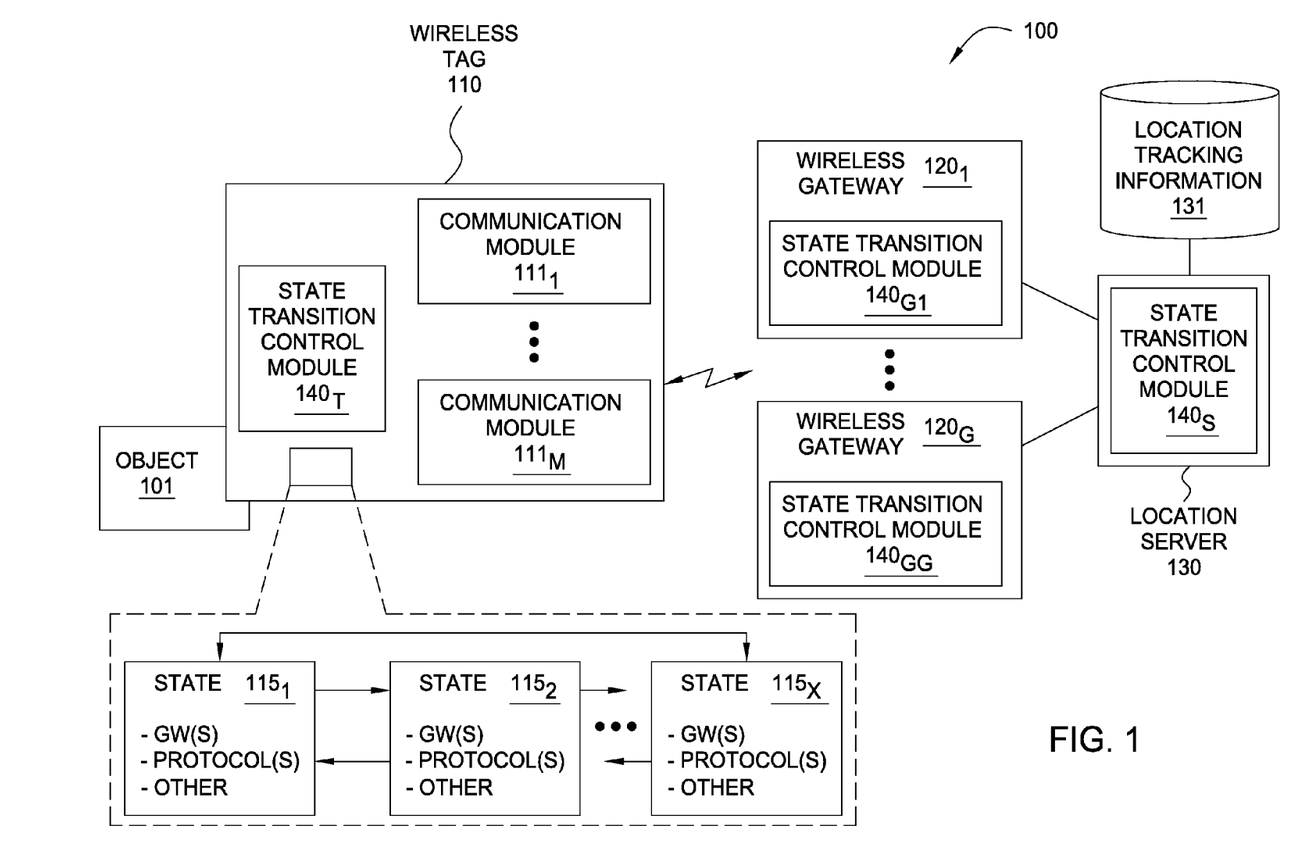
FIG. 1 depicts a wireless communication system supporting communication of location tracking information for a wireless tag.

FIG. 1 depicts a wireless communication system supporting communication of location tracking information for a wireless tag. The wireless communication system 100 includes an object 101, a wireless tag (WT) 110 associated with object 101, a set of wireless gateways (WGs) $120_1$-$120_G$ (collectively, WGs 120), and a location server (LS) 130.

The object 101 may be any object for which location tracking may be provided using WT 110. For example, object 101 may be a person, an animal, a smartphone, a purse, a wallet, a vehicle, a bed being tracked in a healthcare environment, an item being tracked through a manufacturing process, an item being tracked through a delivery process, an item being tracked as part of an inventory of a store, an Internet-of-Things (IoT) device (e.g., a sensor, a monitor, an actuator, a controller, or the like), or any other object for which location tracking may be performed. The WT 110 may be permanently or temporarily affixed to, or otherwise associated with, the object 101. The object 101 may have static or dynamic object data associated therewith, which may be stored by the object 101 and accessed by WT 110, stored by WT 110 on behalf of object 101, provided from object 101 to WT 110 periodically or as needed, read from object 101 by WT 110 periodically or as needed, or the like, as well as various combinations thereof. The object data associated with the object 101 may vary for different object types (e.g., heart rate and temperature of a person or animal, sensor readings from a sensor, or the like). The object data associated with object 101 may be intended for delivery to LS 130 or may be intended for delivery to one or more other servers (e.g., location tracking is performed by LS 130 while sensor data from object 101 is provided to a sensor data server, location tracking is performed by LS 130 while health monitoring information for object 101 is provided to a health monitoring data server, or the like). The object 101 also may receive object data intended to be maintained by object 101 (e.g., provided by one or more servers and delivered to the object by WT 110).

The WT 110 may be any wireless tag which may be used to perform location tracking for object 101. For example, WT 110 may be a Radio Frequency (RF) tag. For example, WT 110 may be a smart device, an IoT device, an RF Identification (RFID) tag, or the like. For example, WT 110 may be an energy-limited wireless device. The WT 110 is configured for at least one of receiving location tracking information (e.g., from WGs 120, from LS 130 via WGs 120, or the like) or transmitting location tracking information (e.g., to WGs 120, to LS 130 via WGs 120, or the like). The types of location tracking information received or transmitted by WT 110 may depend on various factors (e.g., the object type of object 101, a manner in which object 101 is to be tracked, one or more characteristics of the WGs 120 being used to communicate the location tracking information, or the like, as well as various combinations thereof). The types of location tracking information received or transmitted by WT 110 may include information sent by WT 110 and intended for one or more WGs 120, information sent by one or more WGs 120 and intended for WT 110, information sent by WT 110 and intended for LS 130, information sent by LS 130 and intended for WT 110, or the like, as well as various combinations thereof. For example, location tracking information transmitted to WT 110 or from WT 110 may include location tracking messages sent by WT 110 to one or more WGs 120 (e.g., a "keep alive" or "hello" message by which WT 110 indicates to the WG(s) 120 that it is still within their vicinity), location tracking messages sent by one or more WGs 120 to WT 110 (e.g., a "keep alive" or "hello" message by which the WG(s) 120 may indicate to the WT 110 that WT 110 is still within the vicinity of the WG(s) 120), information sent over a communication link between WT 110 and one or more WGs 120, Global Positioning System (GPS) information, wireless signals which may be used for time-of-arrival (ToA) calculations at the WG(s) 120 (e.g., such that the WG(s) 120 may provide the ToA estimates to LS 130 and LS 130 can determine an estimated location of WT 110 based on the known locations of the WG(s) 120 and the ToA estimates received from the WG(s) 120), or the like, as well as various combinations thereof. For example, location tracking information transmitted to WT 110 or from WT 110 may include a tag identifier (TID) of WT 110, a gateway identifier (GID) of a WG 120, timestamp information, or any other suitable types of information which may be used for tracking the location of WT 110. The location tracking information, or portions thereof, may be communicated in a secure manner (e.g., encrypted prior to transmission and decrypted after being received). The communication of location tracking information for tracking the location of WT 110 may be further understood by way of reference to specific examples discussed further below.

The WT 110 includes a set of communication modules $111_1$-$111_M$ (collectively, communication modules 111). In general, a communication module 111 may be configured for at least one of receiving wireless signals or transmitting wireless signals, where such wireless signals may transport one or more types of information (e.g., object data to be communicated for WT 110, location tracking information to be communicated for WT 110, or the like, as well as various combinations thereof). The communication modules 111 may include one or more modules for communication of wireless signals in different directions (e.g., one or more receivers for receiving downlink signals, one or more transmitters for transmitting uplink signals, one or more transceivers supporting both receive and transmit functions, or the like), one or more modules for communication of wireless signals of different access technology types (e.g., a module for cellular-based communications, a module for WiFi-based communications, a module for Bluetooth-based communications, or the like), one or more modules for communication of wireless signals of different access technology generations (e.g., a module for Third Generation (3G) cellular communications, a module for Fourth Generation (4G) cellular communications, a module for Fifth Generation (5G) cellular communications, or the like), one or more modules for communication of different types of information (e.g., a main transceiver module for reception/transmission of location tracking information and an auxiliary receiver for reception of wake-up signals, a main transceiver module for reception/transmission of object data and location tracking information and an auxiliary receiver for reception of wake-up signals, a main transmitter module for transmission of object data and an auxiliary transceiver module for reception/transmission of location tracking information, or the like), or the like, as well as various combinations thereof. It is noted that, where WT 110 includes a communication module 111 configured to provide an auxiliary receiver function for detection of wake-up signals, WT 110 may be configured to control the operational mode of one or more other communication modules 111 based on detection of wake-up signals by the communication module 111 configured to provide the auxiliary receiver function (e.g., the one or more other communication modules 111 may be configured to switch between a sleep mode in which the communication module(s) 111 is not operable to communicate and an active mode in which the communication module(s) 111 is operable to communicate responsive to detection of a wake-up signal by the communication module 111 configured to provide the auxiliary receiver function). It will be appreciated that, although primarily presented with respect to embodiments in which WT 110 includes a set of communication modules 111, in at least some embodiments WT 110 may include only a single communication module 111. It will be appreciated that, although primarily presented with respect to embodiments in which the functions depicted and described as being supported by the communication modules 111 are arranged in a particular way, the functions depicted and described as being supported by the communication modules 111 may be arranged in various other ways (e.g., using different numbers or arrangements of modules, combining at least some of the modules, using sub-modules, or the like, as well as various combinations thereof).

The WT 110 is configured to support a set of states $115_1$-$115_X$ (collectively, states 115). The WT 110 is expected to operate in one state 115 at a time. The WT 110 may be configured to support transitions between the states 115 under various conditions. It will be appreciated that, although primarily depicted as supporting transitions between certain states 115, WT 110 may be configured to support any suitable transitions between any states 115 (e.g., supporting all possible state transitions, supporting only a subset of the possible state transitions, or the like). The states 115 may be defined in terms of the sets of WGs 120 via which WT 110 may communicate (which may be defined in various ways), the communication protocol(s) via which WT 110 may communicate, the air interface(s) or air interface type(s) via which WT 110 may communicate (e.g., 3G cellular, 4G cellular, 5G cellular, WiFi, Bluetooth, or the like), performance parameters according to which WT 110 may communicate (e.g., transit power, transmit duration, receive power, or the like), or the like, as well as various combinations thereof. The sets of WGs 120 via which WT 110 may communicate in a given state 115 may be defined based on one or more of access device type (e.g., fixed access point versus mobile end user device), access technology type (e.g., cellular, WiFi, Bluetooth, or the like), access technology generation (e.g., 3G cellular, 4G cellular, 5G cellular, or the like), geographic location, or the like as well as various combinations thereof. For example, a first state $115_1$ may support communication via any 3G cellular base station and a second state $115_2$ may support communication via a 4G cellular base station, a first state $115_1$ may support communication via any cellular access point and a second state $115_2$ may support communication via any WiFi access point, a first state $115_1$ may support communication via any cellular access point and a second state $115_2$ may support communication via any suitable end user device (e.g., any end user device that has downloaded an application in order to configured itself to operate in this capacity), a first state $115_1$ may support communication via a particular end user device (e.g., a smartphone or other wireless device of a user associated with WT 110) and a second state $115_2$ may support communication via any cellular access point, a first state $115_1$ may support communication via any access device available at a home location and a second state $115_2$ may support communication via access device located away from the home location, and so forth. It will be appreciated that the sets of WGs 120 via which WT 110 may communicate in a given state 115 may dictate the wireless interface(s) of communication module 111 that is used by WT 110 to communicate location tracking information (e.g., different wireless interfaces of WT 110 may be used for different states 115) and, thus, that the sets of WGs 120 via which WT 110 may communicate in a given state 115 also may be considered to be based on the wireless interface(s) of communication module 111 that is used by WT 110 to communicate location tracking information. The communication protocol(s) via which WT 110 may communicate in a given state 115 may be defined based on the set of WGs 120 associated with the state 115 (e.g., cellular protocols where the set of WGs 120 includes cellular access points, WiFi protocols where the set of WGs 120 includes WiFi access points, and so forth), the core network(s) supporting communications by the set of WGs 120 associated with the state 115 (e.g., Ethernet, Multiprotocol Label Switching (MPLS), or the like, as well as various combinations thereof), one or more characteristics of location tracking information (e.g., type of information, quantity of information, format of information, or the like) to be communicated while in the state 115 (e.g., using Open Device Monitoring and Tracking Protocol (OpenDMTP), Zigbee, or the like), or the like, as well as various combinations thereof. The wireless interface(s) or wireless interface type(s) via which WT 110 may communicate in a given state 115 may be defined based on or dictated by the set of WGs 120 via which WT 110 communicates in the given state 115 and the communication protocol(s) via which WT 110 communicates in the given state 115 as discussed above (e.g., communication via a cellular interface where the set of WGs 120 includes cellular access points, communication via a WiFi interface or a Bluetooth interface where the set of WGs 120 includes one or more end user devices, or the like). The performance parameter(s) according to which WT 110 may communicate in a given state 115 may be defined based on the set of WGs 120 associated with the state 115 (e.g., cellular performance parameters where the set of WGs 120 includes cellular access points, WiFi performance parameters where the set of WGs 120 includes WiFi access points, and so forth), the wireless interface(s) or wireless interface type(s) via which WT 110 communicates in the state 115, the network(s) or type(s) of network(s) supporting communications by the set of WGs 120 associated with the state 115, one or more characteristics of location tracking information (e.g., type of information, quantity of information, format of information, or the like) to be communicated while in the state 115, or the like, as well as various combinations thereof. The various characteristics or parameters according to which WT 110 may communicate in the various states 115 (e.g., wireless interface(s) or wireless interface type(s), communication protocols, performance parameter(s), or the like) may be arranged such that different states 115 may use different air interfaces, different states 115 may use a single air interface (e.g., the different states 115 using the single air interface are differentiated by a combination of different transmission durations or power (e.g., by increasing the duration (for a fixed power) or increasing the power (for a fixed duration), the transmission range can be increased at the cost of higher energy)), or the like, as well as various combinations thereof. The set of states 115 may include a default state and one or more non-default states. The set of states may include a sleep state (e.g., in which WT 110 is not operable to communicate) and one or more active states (e.g., in which WT 110 is operable to communicate). The transitions between states 115, as discussed in additional detail further below, may be based on various conditions, such as one or more of a status of operation of WT 110 in a current state 115 (e.g., availability of the WG(s) 120 of the current state 115, level of performance using the WG(s) 120 of the current state 115, or the like), an expected status of operation of WT 110 in a potential next state 115 (e.g., availability of the WG(s) 120 of the next state 115, level of performance expected when using the WG(s) 120 of the next state 115, or the like), a comparison of a status of operation of WT 110 in a current state 115 and an expected status of operation of WT 110 in a potential next state 115, a temporal condition (e.g., responsive to expiration of a timer, at a particular time, based on a schedule, based on a duty cycle (e.g., operating in a first state 115 for 90% of the time and a second state 115 for 10% of the time), or the like), a status of the WT 110 (e.g., a battery status of WT 110, a status of an accelerometer of WT 110, or the like), or the like, as well as various combinations thereof. The conditions for transitions between states 115 may be adjusted based on the current status of WT 110 (e.g., adjusting a time schedule or duty cycle for transitions between states 115 based on a battery status of WT 110, adjusting one or more conditions based on one or more previous transitions between states 115 at WT 110, or the like, as well as various combinations thereof. The states 115 or associated transitions between states 115 may be configured based on various goals (e.g., maximizing a probability of accurately tracking the location of object 101 at the expense of the battery charge of WT 110, minimizing battery usage of WT 110 at the expense of potentially inaccurate or partial tracking of object 101, various ways of balancing accuracy of tracking object 101 and the battery charge of WT 110, or the like, as well as various combinations thereof). The states 115 may have various other characteristics associated therewith (e.g., in terms of one or more of the manner in which WT 110 operates while in states 115, the manner in which WT 110 transitions between states 115, or the like, as well as various combinations thereof). The set of states 115 supported by WT 110 (e.g., the manner in which WT 110 operates in states 115, the manner in which WT 110 transitions between states 115, or the like, as well as various combinations thereof) may be defined in other ways.

The WGs 120 may include any wireless gateways which may support use of WT 110 to perform location tracking for object 101. The WGs 120 may be configured to support communication of location tracking information for WT 110. The location tracking information for WT 110 that is communicated by WGs 120 may include location tracking information received from WT 110 and intended for propagation to LS 130, location tracking information received from LS 130 and intended for propagation to WT 110, location tracking information generated by WGs 120 based on one or more conditions (e.g., based on location tracking information received from WT 110, lack of receipt of location tracking information from WT 110 when such location tracking information is expected, the existence of a communication link between WT 110 and the WG 120, the loss or absence of a communication link between WT 110 and the WG 120, the quality of a communication link between WT 110 and the WG 120, or the like) where the generated location tracking information may be forwarded by the WG 120 to WT 110 or LS 130, or the like, as well as various combinations thereof. The WGs 120 may be configured to receive location tracking information from WT 110 and perform one or more of appending WG-determined location tracking information to the received location tracking information and forwarding the combined location tracking information to LS 130, generating WG-determined location tracking information based on receipt of the location tracking information from WT 110 and forwarding only the WG-determined location tracking information to LS 130, determining the location of the WT 110 based on the location tracking information and providing to LS 130 an indication that the WT 110 is within the vicinity of WG 120, or the like, as well as various combinations thereof. The WG-determined location tracking information provided from a WG 120 to LS 130 may include a GID of the WG 120 (e.g., where LS 130 could look up the location of the WG 120 based on the GID of the WG 120 if the WG 120 is a fixed WG or a mobile WG for which LS 130 has access to its location tracking information), a location of the WG 120 where the WG 120 is a fixed WG or a mobile WG (e.g., determined by the WG 120 using one or more of GPS techniques, RFID fingerprinting, an OS-specific location service, or the like), an indication that WT 110 is within the vicinity of the WG 120, timestamp information, or the like, as well as various combinations thereof. The types of location tracking information that may be communicated by WGs 120 (e.g., received from WT 110 and forwarded by WGs 120, generated by WGs 120, or the like, as well as various combinations thereof) may be further understood by way of reference to specific examples discussed further below. The WGs 120 may be configured to control or facilitate transitions of WT 110 between states 115. The WGs 120 may be configured to perform various other functions. For example, WGs 120 may include cellular access points (e.g., base stations, picocells, femtocells, or the like), WiFi access points, end user devices (e.g., smartphones, tablet computers, laptop computers, or the like) configured to operate as relays between WT 110 and wireless access points (e.g., cellular access points, WiFi access points, or the like), or the like, as well as various combinations thereof. It will be appreciated that communication between WGs 120 and WT 110 is expected to be wireless (although it will be appreciated that some objects may be associated with tags which may also or alternatively support wired communications). It also will be appreciated that communication between WGs 120 and LS 130 may include wired communications and/or wireless communications, which may depend on the type of device used as the WG 120 (e.g., for a WG 120 that is a fixed wireless access point, communications with LS 130 may be wired (e.g., using Ethernet networks, cable networks, fiber-optic networks, or the like); whereas for a WG 120 that is a mobile wireless access device, such as a smartphone or other end user terminal, communications from the mobile wireless access device to a fixed wireless access point may be wireless (e.g., using cellular communications (e.g., 3G cellular, 4G cellular, 5G cellular, or the like), WiFi communications, or the like) while communications from the fixed wireless access point to the LS 130 may be wired (e.g., using Ethernet networks, cable networks, fiber-optic networks, or the like)).

The LS 130 is configured to support location tracking for WT 110 (as well as various other WTs, which are omitted for purposes of clarity). It is noted that LS 130 may or may not be aware of the associated object 101 for which the WT 110 is used to perform location tracking (or other objects for which other WTs may be used to perform location tracking which, again, are omitted for purposes of clarity). The LS 130 may maintain location tracking information for WT 110 (as well as various other WTs, which are omitted for purposes of clarity), which is depicted as location tracking information 131 associated with LS 130. The location tracking information 131 maintained by LS 130 may include, for each WT for which LS 130 performs location tracking (again, WT 110 as well as various other WTs which are omitted for purposes of clarity), an estimated location of the WT. The location tracking information 131 maintained by LS 130 may include, for each WT for which LS 130 performs location tracking, a time at which the estimated location of the WT was last determined or other suitable types of location tracking information. The LS 130 may be configured to use location tracking information 131 to support various location-based services, to provide location tracking information 131 to other servers for use by the other servers to support various location-based services, or the like, as well as various combinations thereof.

The LS 130 may be configured to support processing of location tracking information for WT 110. The location tracking information for WT 110 that is processed by LS 130 may include location tracking information received from WT 110 via WGs 120, location tracking information received from WGs 120 (e.g., generated at WGs 120 based on interaction by WGs 120 with WT 110), or the like, as well as various combinations thereof. The types of location tracking information that may be processed by LS 130 may be further understood by way of reference to specific examples discussed further below. The LS 130 may be configured to control or facilitate transitions of WT 110 between states 115.

The wireless communication system 100 includes a set of state transition control modules (STCMs) 140 configured to control or facilitate transitions of WT 110 between states 115 supported by WT 110. The set of STCMs 140 includes an STCM $140_T$ on WT 110, a set of STCMs $140_{G1}$-$140_{GG}$ on WGs $120_1$-$120_G$, and an STCM $140_S$ on LS 130.

The STCM $140_T$ on WT 110 may be configured to control or facilitate transitions of WT 110 between states 115 based on conditions detected locally by WT 110, based on receipt of information (e.g., a state transition command configured to trigger the WT 110 to transition between states 115, information for use by WT 110 in facilitating a transition between states 115, or the like) from a network device (e.g., from one of the WGs 120, from LS 130, or the like), or the like, as well as various combinations thereof. The STCM $140_T$ on WT 110 may be configured to control a transition of WT 110 from a first state $115_i$ (in which WT 110 may communicate via a first WG $120_i$) to a second state $115_j$ (in which WT 110 may communicate via a second WG $120_j$) based on one or more of a determination that the first WG $120_i$ can no longer support communication with WT 110 (e.g., WT 110 is out of wireless range of the first WG $120_i$, the SNR of the first WG $120_i$ is below a threshold or is below a threshold for a threshold length of time, or the like), a determination that the first WG $120_i$ can no longer support communication with WT 110 that satisfies a particular quality requirement, a determination that the second WG $120_j$ is better suited than the first WG $120_i$ for communication with WT 110 (e.g., WT 110 detects a better SNR for the second WG $120_j$ than for the first WG $120_i$, WT 110 detects that it is leaving the coverage area of the first WG $120_i$ and moving toward the coverage area of the second WG $120_j$, or the like), detection of a signal from a remote device (e.g., a wake-up signal from a WG 120, a beacon signal from a WG 120, or the like), detection of a temporal condition (e.g., expiration of a timer, detection of a particular date or time, or the like), detection of a location-based condition (e.g., detection that WT 110 has entered or left a defined indoor location, detection that WT 110 has entered or left a defined geographic location, or the like), detection of a motion-based condition (e.g., WT 110 started moving, WT 110 stopped moving, WT 110 changed direction, WT is moving in a particular direction, or the like) which may be detected at WT 110 using one or more capabilities of WT 110 (e.g., an accelerometer, a GPS-based capability, or the like), or the like, as well as various combinations thereof. The STCM $140_T$ on WT 110 may be configured to control a transition of WT 110 from a first state $115_i$ to a second state $115_j$ based on receipt of a state transition command from a network device. The STCM $140_T$ on WT 110 may be configured to facilitate a transition of WT 110 from a first state $115_i$ (in which WT 110 may communicate via a first WG $120_i$) to a second state $115_j$ (in which WT 110 may communicate via a second WG $120_j$) based on receipt, from the first WG $120_i$, of information which may be used by WT 110 to communicate via the second WG $120_j$ (e.g., a transmit power that WT 110 may use to communicate via the second WG $120_j$, an amount of bandwidth that WT 110 may use to communicate via the second WG $120_j$, a frequency channel that WT 110 may use to communicate via the second WG $120_j$, or the like, as well as various combinations thereof). The STCM $140_T$ on WT 110 may be configured to provide various other functions to control or facilitate transitions of WT 110 between states 115.

The STCM $140_G$ on a given WG 120 may be configured to control or facilitate transitions of WT 110 between states 115.

The STCM $140_{Gi}$ on a given WG $120_i$ associated with a current state $115_i$ in which WT 110 is currently operating may be configured to control or facilitate a transition of WT 110 from the current state $115_i$ to a next state $115_j$ (in which WT 110 will communicate via a WG $120_j$ associated with the next state $115_j$). The STCM $140_{Gi}$ on the given WG $120_i$ associated with the current state $115_i$ may control or facilitate a transition of WT 110 from the current state $115_i$ to the next state $115_j$ based on a determination that WG $120_i$ can no longer support communication by WT 110 (e.g., detection of a failure condition on WG $120_i$, detection that WG $120_i$ has lost its upstream connection to LS 130, based on a determination that WG $120_i$ has not received a signal from WT 110 for a threshold length of time, or the like), a determination that WG $120_i$ can no longer support communication with WT 110 that satisfies a particular quality requirement (e.g., the SNR of a signal received from WT 110 is below a threshold or is below a threshold for a threshold length of time), a determination that the second WG $120_j$ is better suited than the WG $120_i$ for communication with WT 110 (e.g., responsive to a message from a controller configured to determine that the second WG $120_j$ is better suited than the WG $120_i$ for communication with WT 110, based on information exchanged between the WG $120_i$ and the second WG $120_j$, or the like), detection of a temporal condition (e.g., expiration of a timer, detection of a particular date or time, or the like), detection of a location-based condition (e.g., detection that WT 110 has entered or left a defined indoor location, detection that WT 110 has entered or left a defined geographic location, or the like), or the like, as well as various combinations thereof. The STCM $140_{Gi}$ on the given WG $120_i$ associated with the current state $115_i$ may control a transition of WT 110 from the current state $115_i$ to the next state $115_j$ by sending a state transition command to the WT 110 (to trigger the WT 110 to transition from the current state 115$_i$ to the next state 115$_j$), by sending a state transition command to the second WG 120$_j$ associated with the next state 115$_j$ (e.g., for triggering the second WG 120$_j$ to send the state transition command to WT 110, for triggering the second WG 120$_j$ to send a wake-up signal to cause WT 110 to wake up and then to send the state transition command to WT, or the like), by sending a state transition command to LS 130 (e.g., for triggering LS 130 to send the state transition command to WT 110, for triggering LS 130 to send a wake-up signal to cause WT 110 to wake up and then to send the state transition command to WT, or the like), or the like, as well as various combinations thereof. The STCM 140$_{Gi}$ on the given WG 120$_i$ associated with the current state 115$_i$ may facilitate a transition of WT 110 from the current state 115$_i$ to the next state 115$_j$ by sending state transition facilitation information to WT 110 (e.g., information which may be used by WT 110 to communicate via the second WG 120$_j$, such as one or more of a transmit power that WT 110 may use to communicate via the second WG 120$_j$, an amount of bandwidth that WT 110 may use to communicate via the second WG 120$_j$, a frequency channel that WT 110 may use to communicate via the second WG 120$_j$, or the like, as well as various combinations thereof), sending state transition facilitation information to second WG 120$_j$ (e.g., authentication credentials which may be used by second WG 120$_j$ to authenticate WT 110, communication information for use by second WG 120$_j$ in supporting communications with WT 110, or the like, as well as various combinations thereof), sending state transition facilitation information to LS 130 (e.g., authentication credentials which may be used by LS 130 to authenticate WT 110, communication information for use by LS 130 in supporting communications with WT 110, or the like, as well as various combinations thereof), or the like, as well as various combinations thereof. The STCM 140$_{Gi}$ on a given WG 120$_i$ associated with a current state 115$_i$ in which WT 110 is currently operating may be configured to provide various other functions to control or facilitate a transition of WT 110 from the current state 115$_i$ to the next state 115$_j$.

The STCM 140$_{Gj}$ on a given WG 120$_j$ associated with a next state 115$_j$ to which WT 110 may transition, from a current state 115$_i$ in which WT 110 is currently operating (and in which WT 110 may communicate via a WG 120$_i$ associated with the current state 115$_i$), may be configured to control or facilitate transition of WT 110 from the current state 115$_i$ to the next state 115$_j$. The STCM 140$_{Gj}$ on the given WG 120$_j$ associated with the next state 115$_j$ may control or facilitate a transition of WT 110 from the current state 115$_i$ to the next state 115$_j$ based on a determination that WG 120$_i$ can no longer support communication by WT 110 (e.g., responsive to a notification from WG 120$_i$ or other suitable network element), a determination that WG 120$_i$ can no longer support communication with WT 110 that satisfies a particular quality requirement (e.g., responsive to a notification from WG 120$_i$ or other suitable network element, based on information exchanged between WG 120$_j$ and WG 120$_i$, or the like), a determination that the WG 120$_j$ is better suited than the WG 120$_i$ for communication with WT 110, detection of a temporal condition (e.g., expiration of a timer, detection of a particular date or time, based on a schedule, or the like), detection of a location-based condition (e.g., detection that WT 110 has entered or left a defined indoor location, detection that WT 110 has entered or left a defined geographic location, or the like), or the like, as well as various combinations thereof. The STCM 140$_{Gj}$ on the given WG 120$_j$ associated with the next state 115$_j$ may control a transition of WT 110 from the current state 115$_i$ to the next state 115$_j$ by sending a state transition command to the WT 110 (to trigger the WT 110 to transition from the current state 115$_i$ to the next state 115$_j$), by sending a wake-up signal to cause WT 110 to wake up and then sending a state transition command to the WT 110 (to trigger the WT 110 to transition from the current state 115$_i$ to the next state 115$_j$), by sending a state transition command to the WG 120$_i$ associated with the current state 115$_i$ (e.g., for triggering the WG 120$_i$ associated with the current state 115$_i$ to send the state transition command to WT 110, for triggering the WG 120$_i$ to send a wake-up signal to cause WT 110 to wake up and then to send the state transition command to WT, or the like), by sending a state transition command to LS 130 (e.g., for triggering LS 130 to send the state transition command to WT 110, for triggering LS 130 to send a wake-up signal to cause WT 110 to wake up and then to send the state transition command to WT, or the like), or the like, as well as various combinations thereof. The STCM 140$_{Gj}$ on the given WG 120$_j$ associated with the next state 115$_j$ may facilitate a transition of WT 110 from the current state 115$_i$ to the next state 115$_j$ by sending state transition facilitation information to WT 110 (e.g., information which may be used by WT 110 to communicate via the WG 120$_j$ after the transition, such as one or more of a transmit power that WT 110 may use to communicate via the WG 120$_j$, an amount of bandwidth that WT 110 may use to communicate via the WG 120$_j$, a frequency channel that WT 110 may use to communicate via the WG 120$_j$, or the like, as well as various combinations thereof), sending state transition facilitation information to WG 120$_i$ (e.g., information to inform WG 120$_i$ that WT 110 is transitioning to WG 120$_j$ or any other suitable information), sending state transition facilitation information to LS 130 (e.g., authentication credentials which may be used by LS 130 to authenticate WT 110, communication information for use by LS 130 in supporting communications with WT 110, or the like, as well as various combinations thereof), or the like, as well as various combinations thereof. The STCM 140$_{Gj}$ on the given WG 120$_j$ associated with the next state 115$_j$ may facilitate a transition of WT 110 from the current state 115$_i$ to the next state 115$_j$ by sending a state transition signal to WT 110 based on a determination that the WG 120$i$ associated with the current state 115$_1$ is unreliable (e.g., where WT 110 includes a transmitter on air interface A and a receiver on air interface B, the state transition may be effected as follows: (1) while in current state 115$_i$, WT 110 communicates with WG 120$_i$ by transmitting to WG 120$_i$ on air interface A, however, if WT 110 leaves the vicinity of WG 120$_i$ there is no way for WT 110 to detect this since WG 120$_i$ is not transmitting to WT 110 (2) although WT 110 cannot detect that it has left the vicinity of WG 120$_i$, WG 120$_i$ can detect this and responsively notify LS 130 which, in turn, instructs WG 120$_j$ associated with next state 115$_j$ to send a high-power signal to WT 110 on air interface B to initiate the change from the current state 115$_i$ to the next state 115$_j$.

The STCM 140$_{Gj}$ on a given WG 120$_j$ associated with a next state 115$_j$ to which WT 110 may transition may be configured to provide various other functions to control or facilitate a transition of WT 110 from the current state 115$_i$ to the next state 115.

The STCM 140$_G$ on a given WG 120 may be configured to provide various other functions to control or facilitate transitions of WT 110 between states 115.

The STCM 140$_G$ on LS 130 may be configured to control or facilitate transitions of WT 110 between states 115. The STCM 140$_S$ on LS 130 may be configured to control or facilitate transitions of WT 110 between states 115 based on conditions detected locally by LS 130, based on receipt of information from a network device (e.g., from one of the WGs 120 or any other suitable network device), or the like, as well as various combinations thereof. The conditions or information include conditions or information similar to the conditions or information described with respect to the operation of STCM 140$_S$ on LS 130 and STCMs 140G on WGs 120, other conditions or information which may be available at or accessible to LS 130, or the like, as well as various combinations thereof. The STCM 140$_S$ on LS 130 may be configured to provide various other functions to control or facilitate transitions of WT 110 between states 115.

The operation of STCMs 140 in controlling or facilitating transitions of WT 110 between states 115 may be further understood by way of descriptions of embodiments and examples related to use of the WT 110 for performing location tracking for object 101.

In one embodiment, for example, WT 110 may be used to track object 101, where object 101 is a wallet (and WT 110 is attached to the wallet) and the owner of the wallet possesses a smartphone. The WT 110 may be configured to support two states: a default state and a lost state. In the default state, WT 110 is in short-range communication with the smartphone via a communication link between the WT 110 and the smartphone (as long as the WT 110 and smartphone stay within a certain proximity of each other as dictated by the existence of the communication link), and the smartphone operates as a WG 120 for WT 110. The smartphone periodically sends to LS 130 location tracking information for tracking the location of the smartphone (e.g., a location tracking packet that includes the tag ID of WT 110, the handset ID of the smartphone, a location of the smartphone (e.g., geographic location), and a timestamp indicative of the current time). The location of WT 110 (and, thus, the wallet) is achieved implicitly through the location of the smartphone and knowing that WT 110 is in proximity to the smartphone as long as the communication link between WT 110 and the smartphone is not broken. If the wallet and smartphone are separated from each other by too great of a distance, the communication link the between WT 110 and the smartphone is broken. The WT 110 may detect that the communication link with the smartphone has been broken and may responsively transition from the default state to the lost state (indicative that the wallet is no longer in close proximity to the smartphone and, thus, is no longer in close proximity to the person and is therefore considered to be lost). For example, WT 110 may determine that the communication link has been broken responsive to a determination that WT 110 does not receive an acknowledgment for a signal sent from the WT 110 to the smartphone, responsive to a determination that the signal from the smartphone is below 0 dB for a threshold length of time (e.g., 10 minutes, 30 minutes, or the like), or the like. In the lost state, WT 110 transmits a higher-power signal which may be detected by more distant infrastructure WGs 120 (e.g., base stations, WiFi access points, or the like) such that the location of the WT 110 may be determined (e.g., by LS 130 using time-difference-of-arrival calculations based on location tracking information received by LS 130 from multiple infrastructure WGs 120) and the wallet may be located. After the wallet is located by the owner and again returns to being in close proximity to the smartphone, WT 110 may detect the presence of the smartphone and transition from the lost state back to the default state. It is noted that the energy consumption of WT 110 in the default and lost states is different.

In the default state, WT 110 communicates with the nearby smartphone using relatively low power signals such that the battery of the WT 110 may be expected to last for a significant length of time. By contrast, in the lost state, WT 110 communicates with most distant gateways using relatively high power signals such that the battery of the WT 110 may start to be drained very quickly. The lost state could be defined in various ways to try to tradeoff pursuit of a relatively aggressive transmission strategy to try to locate the wallet as quickly as possible versus controlling depletion of the battery of the WT 110. For example, the lost state could be defined to use a relatively high transmit power to try to locate the wallet as quickly as possible (e.g., using transmit power selected such that the battery of WT 110 is expected to last for only a few days). For example, the lost state could be defined to operate based on a duty cycle that uses two different transmit powers to try to aggressively enable location of the wallet while controlling usage of the battery of WT 110 (e.g., transmitting 90% of the time at a first transmit power adapted to reach remote WGs 120 and transmitting 10% of the time at a second transmit power adapted to reach remote WGs 120 and which is greater than the first transmit power to improve the changes that the wireless signals are detected by remote WGs 120). It will be appreciated that the tradeoff in energy usage between the default and lost states may be warranted for various important objects (e.g., the wallet of this example, a pet, or the like) and that the battery of WT 110 could be replaced after the wallet is found (a relatively small expense if it results in the wallet being found by the owner relatively quickly).

In one embodiment, for example, which may be a continuation of the above embodiment for tracking of the wallet, WT 110 may be configured to support three states: the default state discussed above, the lost state discussed above, and a lost opportunistic state discussed further below. As in the above example, WT 110 may be used to track object 101, where object 101 is a wallet (and WT 110 is attached to the wallet) and the owner of the wallet possesses a smartphone. In the default state, WT 110 is in short-range communication with the smartphone via a communication link between the WT 110 and the smartphone (as long as the WT 110 and smartphone stay within a certain proximity of each other as dictated by the existence of the communication link), and the smartphone operates as a WG 120 for WT 110. The smartphone periodically sends to LS 130 location tracking information for tracking the location of the smartphone, and the location of WT 110 (and, thus, the wallet) is achieved implicitly through the location of the smartphone and knowing that WT 110 is in proximity to the smartphone as long as the communication link between WT 110 and the smartphone is not broken. If the wallet and smartphone are separated from each other by too great of a distance, the communication link the between WT 110 and the smartphone is broken. The WT 110 may detect that the communication link with the smartphone has been broken and may responsively transition from the default state to the lost opportunistic state (indicative that the wallet is no longer in close proximity to the smartphone and, thus, is no longer in close proximity to the person and is therefore considered to be lost). In the lost opportunistic state, the set of WGs 120 includes any mobile end device (e.g., smartphone, tablet, or the like) running a particular localization application. In the lost opportunistic state, the WT 110 periodically sends a beacon signal in an attempt to communicate with any mobile end device running the location application that may be within its vicinity. If the beacon signal of the WT 110 is detected by a mobile end device running the localization application, the mobile end device running the localization application sends location tracking information to LS 130 (e.g., via existing wireless infrastructure, such as a cellular macrocell or a WiFi access point). The location tracking information sent by WT 110 may include any information which may be used by LS 130 to determine the location of WT 110 and, thus, of the associated wallet. For example, if the beacon signal of the WT 110 is detected by a mobile end device running the localization application, the mobile end device running the localization application may send a location tracking packet that includes the tag ID of WT 110, the device ID of the mobile end device that detected the beacon, a location of the mobile end device that detected the beacon (e.g., geographic location), and a timestamp indicative of the current time. It is noted that, unlike in the default state, there is no prior relationship between the WT 110 and the WG 120 (namely, the mobile end device that detects the beacon from the WT 110). The lost opportunistic state may be considered to be a crowd-sourced mode. The WT 110 may remain in the lost opportunistic state for a pre-determined length of time (e.g., two hours, a day, or the like), after which WT 110 may transition from the lost opportunistic state to the lost state. In the lost state, as discussed above, WT 110 transmits a higher-power signal which may be detected by more distant infrastructure WGs 120 such that the location of the WT 110 may be determined and the wallet may be located. After the wallet is located by the owner and again returns to being in close proximity to the smartphone, WT 110 may detect the presence of the smartphone and transition from the lost state back to the default state. It will be appreciated that while the lost opportunistic state is more energy efficient than the lost state, the lost opportunistic state may not be suitable for latency sensitive applications since the time until a participating mobile end device passes within range of the beacon of the WT 110 is unknown.

It will be appreciated that, although primarily depicted and described herein with respect to embodiments including specific numbers, types, and arrangements of elements, various embodiments may support or may be adapted to support various other numbers, types, or arrangements of elements. It will be appreciated that, although primarily depicted and described herein with respect to embodiments in which WT 110 supports a specific number and arrangement of states 115 (e.g., in terms of the types of transitions between states 115), WT 110 may be configured to support various other numbers or arrangements of states 115. It will be appreciated that, although primarily depicted and described herein with respect to embodiments in which WGs 120 and LS 130 support communication of location tracking information for a single WT 110, at least some of the WGs 120 and LS 130 may be configured to support communication of location tracking information for multiple WTs 110. It will be appreciated that other variations are contemplated.

Figure 2:
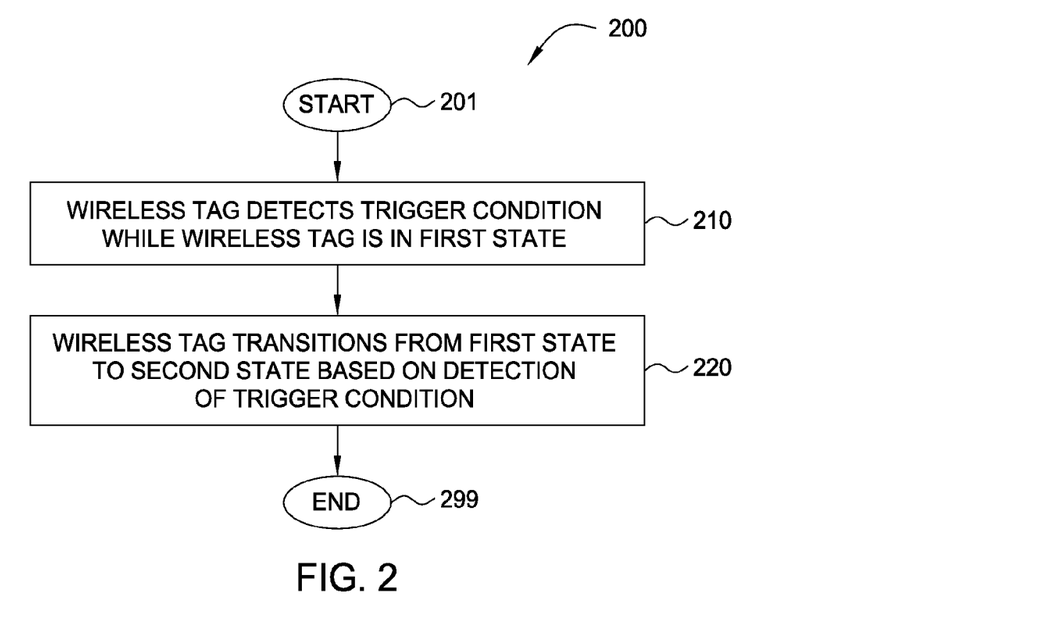
FIG. 2 depicts a method for use by a wireless tag for supporting communication of location tracking information for the wireless tag.

FIG. 2 depicts a method for use by a wireless tag for supporting communication of location tracking information for the wireless tag. It will be appreciated that, although primarily depicted and described as being performed serially, at least a portion of the steps of method 200 may be performed contemporaneously or in a different order than as presented in FIG. 2. At step 201, method 200 begins. At step 210, a trigger condition is detected at the wireless tag while the wireless tag is operating in a first state. At step 220, the wireless tag transitions from the first state to a second state based on detection of the trigger condition at the wireless tag. The trigger condition may be detection of a local condition on the wireless tag, receipt of a transition control message from a network element (e.g., a wireless gateway associated with the first state, a wireless gateway associated with the second state, a location server, or the like), or the like. At step 299, method 200 ends. It will be appreciated that method 200 of FIG. 2 may be further understood when considered in conjunction with the description of FIG. 1.

Figure 3:
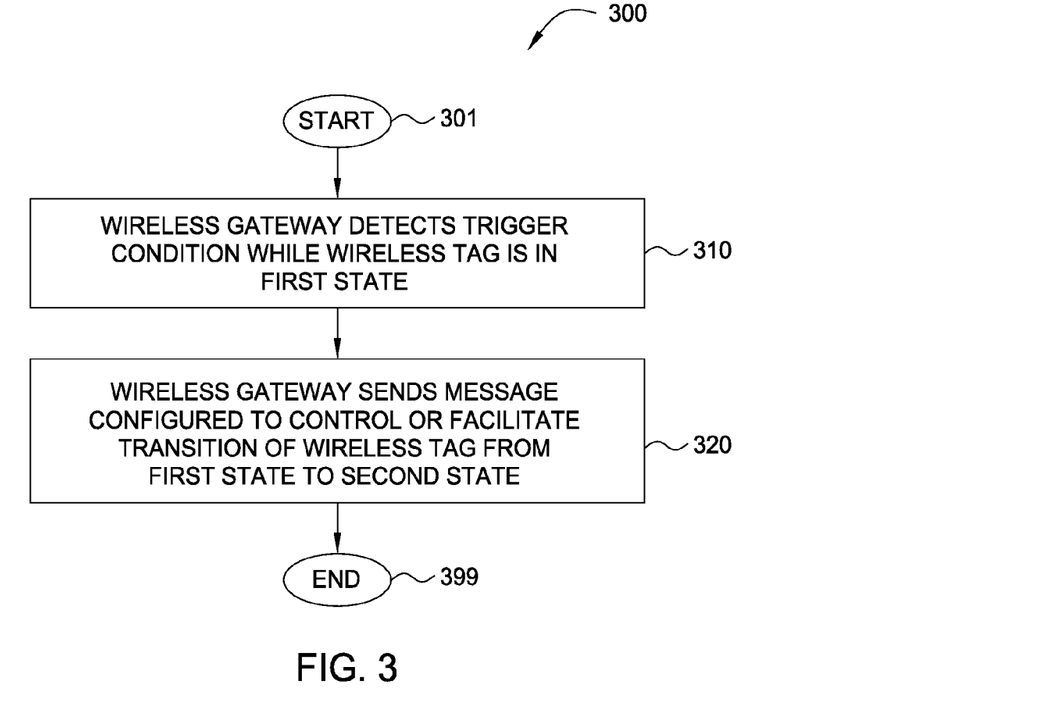
FIG. 3 depicts a method for use by a wireless gateway for supporting communication of location tracking information for a wireless tag.

FIG. 3 depicts a method for use by a wireless gateway for supporting communication of location tracking information for a wireless tag. It will be appreciated that, although primarily depicted and described as being performed serially, at least a portion of the steps of method 300 may be performed contemporaneously or in a different order than as presented in FIG. 3. At step 301, method 300 begins. At step 310, a trigger condition is detected at the wireless gateway. At step 320, the wireless gateway sends a message that is configured to control or facilitate a transition of the wireless tag from a first state to a second state. The trigger condition may be detection of a local condition at the wireless gateway, receipt of a message from a remote element (e.g., the wireless tag, a wireless gateway associated with the first state, a wireless gateway associated with the second state, a location server, or the like), or the like. The message configured to control or facilitate the transition of the wireless tag from the first state to the second state may be a state transition message configured to trigger the wireless tag to transition from the first state to the second state (e.g., a message sent from a first wireless gateway associated with the first state to the wireless tag, a message sent from a first wireless gateway associated with the first state to a second wireless gateway associated with the second state to trigger the second wireless gateway to send a message to trigger the wireless tag to transition from the first state to the second state, a message sent from a second wireless gateway associated with the second state to the wireless tag, a message sent from a second wireless gateway associated with the second state to a first wireless gateway associated with the first state to trigger the first wireless gateway to send a message to trigger the wireless tag to transition from the first state to the second state, a message sent from a first wireless gateway associated with the first state or a second wireless gateway associated with the second state to a location server to trigger the location server to send a message to trigger the wireless tag to transition from the first state to the second state, or the like), a message including information configured to support transition of the wireless tag from the first state to the second state or to support communication by the wireless tag while in the second state (e.g., a message from a first wireless gateway associated with the first state to the wireless tag where the message includes information for use by the wireless tag to communicate via the second wireless gateway after transitioning to the second state, a message from a first gateway associated with the first state to a second wireless gateway associated with the second state where the message includes information for use by the second wireless gateway to authenticate the wireless tag at the second wireless gateway during transition from the first state to the second state, or the like), or the like, as well as various combinations thereof. At step 399, method 300 ends. It will be appreciated that method 300 of FIG. 3 may be further understood when considered in conjunction with the description of FIG. 1.

Figure 4:
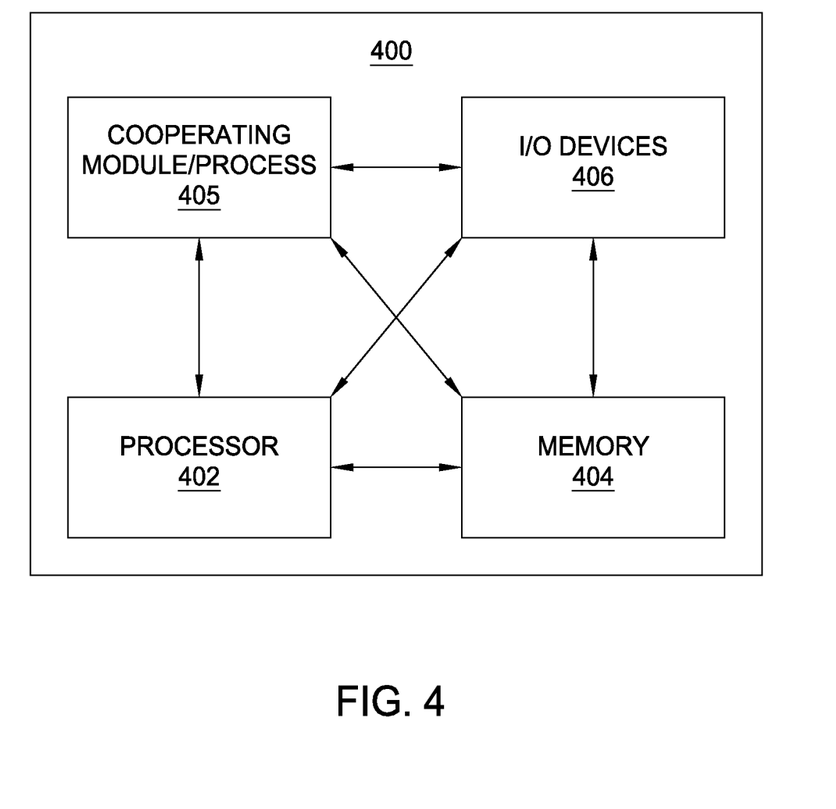
FIG. 4 depicts a high-level block diagram of a computer suitable for use in performing functions presented herein.

FIG. 4 depicts a high-level block diagram of a computer suitable for use in performing functions described herein.

The computer 400 includes a processor 402 (e.g., a central processing unit (CPU) or other suitable processor(s)) and a memory 404 (e.g., random access memory (RAM), read only memory (ROM), or the like).

The computer 400 also may include a cooperating module/process 405. The cooperating process 405 can be loaded into memory 404 and executed by the processor 402 to implement functions as discussed herein and, thus, cooperating process 405 (including associated data structures) can be stored on a computer readable storage medium, e.g., RAM memory, magnetic or optical drive or diskette, and the like.

The computer 400 also may include one or more input/output devices 406 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 400 depicted in FIG. 4 provides a general architecture and functionality suitable for implementing functional elements described herein and/or portions of functional elements described herein. For example, computer 400 provides a general architecture and functionality suitable for implementing one or more of WT 110, a portion of WT 110, a WG 120, a portion of a WG 120, LS 130, a portion of LS 130, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. A wireless tag, comprising:
a wireless communication module configured for communication of wireless signals comprising location tracking information; and
a controller communicatively connected to the wireless communication module, the controller configured to control transitions of the wireless tag between states in a set of states, the set of states including a first state in which the wireless tag is configured to support communication of the location tracking information via a wireless user device, a second state in which the wireless tag is configured to support communication of the location tracking information via a set of wireless user devices running a localization application, and a third state in which the wireless tag is configured to support communication of the location tracking information via a set of cellular gateways.

2. The wireless tag of claim 1, wherein the controller is configured to:
control, based on detection of a trigger condition at the wireless tag, a transition of the wireless tag from the first state to the second state.

3. The wireless tag of claim 2, wherein the trigger condition comprises at least one of a receipt of a state transition message, a determination that the wireless tag is outside of wireless range of the wireless user device, or a determination that a signal-to-noise ratio (SNR) of the wireless user device is less than a threshold.

4. The wireless tag of claim 1, wherein the controller is configured to:
receive information configured to facilitate communication of location tracking information by the wireless tag in the third state.

5. The wireless tag of claim 4, wherein the information configured to facilitate communication of location tracking information by the wireless tag in the third state comprises at least one of a transmit power for the wireless tag in the third state, a receive power for the wireless tag in the third state, a bandwidth for the wireless tag in the third state, or a frequency channel for the wireless tag in the third state.

6. The wireless tag of claim 1, wherein the controller is configured to:
control, based on detection of a trigger condition at the wireless tag, a transition of the wireless tag from the second state to the first state.

7. The wireless tag of claim 6, wherein the trigger condition comprises at least one of a temporal condition, a receipt of a state transition message, a determination that the wireless tag is within wireless range of the wireless user device, or a determination that a signal-to-noise ratio (SNR) of the wireless user device is greater than a threshold.

8. The wireless tag of claim 1, wherein the controller is configured to:
control, based on detection of a trigger condition at the wireless tag, a transition of the wireless tag from the second state to the third state.

9. The wireless tag of claim 8, wherein the trigger condition comprises at least one of a temporal condition or a receipt of a state transition message.

10. A method for use by a wireless tag, comprising:
controlling, by a processor, transitioning of the wireless tag between states in a set of states, the set of states including a first state in which the wireless tag is configured to support communication of the location tracking information via a wireless user device, a second state in which the wireless tag is configured to support communication of the location tracking information via a set of wireless user devices running a localization application, and a third state in which the wireless tag is configured to support communication of the location tracking information via a set of cellular gateways.

11. A wireless gateway, comprising:
a processor and a memory communicatively connected to the processor, the processor configured to:
receive, by the wireless gateway from a wireless tag, location tracking information associated with the wireless tag;

detect, by the wireless gateway, a condition associated with the wireless tag;

send, from the wireless gateway toward the wireless tag based on the condition associated with the wireless tag, communication facilitation information configured to facilitate communication of the location tracking information by the wireless tag via a second wireless gateway; and send, from the wireless gateway toward the wireless tag, a state transition message configured to control a transition of the wireless tag from a first state in which the wireless tag is configured to support communication of the location tracking information via the wireless gateway to a second state in which the wireless tag is configured to support communication of the location tracking information via the second wireless gateway.

12. The wireless gateway of claim 11, wherein the condition comprises a determination that the wireless gateway cannot effectively communicate with the wireless tag.

13. The wireless gateway of claim 12, wherein the determination that the wireless gateway cannot effectively communicate with the wireless tag comprises at least one of a determination that the wireless tag is outside of a wireless coverage area of the wireless gateway or a determination that a signal-to-noise ratio (SNR) of a signal of the wireless tag is below a threshold.

14. The wireless gateway of claim 11, wherein the condition associated with the wireless tag is detected based on wireless tag status information associated with the wireless tag.

15. The wireless gateway of claim 11, wherein the processor is configured to send a second message toward a location server.

16. The wireless gateway of claim 11, wherein
the communication facilitation information comprises at least one of a transmit power for the wireless tag in the second state, a receive power for the wireless tag in the second state, a bandwidth for the wireless tag in the second state, or a frequency channel for the wireless tag in the second state.

17. The wireless gateway of claim 11, wherein the processor is configured to send a second message toward the second wireless gateway, wherein the second message comprises information configured for use by the second wireless gateway for authenticating the wireless tag to communicate via the second wireless gateway.

* * * * *